(12) United States Patent
Nachenberg

(10) Patent No.: US 9,202,050 B1
(45) Date of Patent: Dec. 1, 2015

(54) SYSTEMS AND METHODS FOR DETECTING MALICIOUS FILES

(71) Applicant: Symantec Corporation, Mountain View, CA (US)

(72) Inventor: Carey Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 281 days.

(21) Appl. No.: 13/715,265

(22) Filed: Dec. 14, 2012

(51) Int. Cl.
*G06F 21/56* (2013.01)
*G06F 21/57* (2013.01)

(52) U.S. Cl.
CPC .............. *G06F 21/56* (2013.01); *G06F 21/564* (2013.01); *G06F 21/566* (2013.01); *G06F 21/577* (2013.01)

(58) Field of Classification Search
CPC ..... G06F 21/56; G06F 21/564; G06F 21/577; G06F 21/566
USPC ......................................... 726/22, 23, 24, 25
See application file for complete search history.

(56) References Cited

U.S. PATENT DOCUMENTS

| | | | |
|---|---|---|---|
| 7,539,871 B1* | 5/2009 | Osborn ........................ | 713/176 |
| 8,302,193 B1 | 10/2012 | Gardner et al. | |
| 8,695,096 B1* | 4/2014 | Zhang ............................. | 726/24 |
| 2004/0181687 A1* | 9/2004 | Nachenberg et al. ......... | 713/201 |
| 2008/0141373 A1* | 6/2008 | Fossen et al. .................... | 726/23 |
| 2009/0044024 A1* | 2/2009 | Oberheide et al. ............ | 713/188 |
| 2009/0158046 A1* | 6/2009 | Milliken et al. ............... | 713/181 |
| 2011/0138465 A1* | 6/2011 | Franklin et al. ................. | 726/23 |
| 2012/0159631 A1* | 6/2012 | Niemela et al. ................. | 726/24 |
| 2013/0283382 A1* | 10/2013 | Kim et al. ........................ | 726/23 |
| 2014/0143869 A1* | 5/2014 | Pereira et al. ................... | 726/23 |

OTHER PUBLICATIONS

Yier Jin et al., Hardware Trojan Detection Using Path Delay Fingerprint, Jun. 9, 2008, IEEE, pp. 51-57.*
Jin S. Seo et al., A robust image fingerprinting system using the Radon transform, Apr. 2004, ScienceDirect, vol. 19, Issue 4, pp. 325-339.*
Ira Cohen et al., Capturing, Indexing, Clustering, and Retrieving System History, Dec. 2005, ACM, vol. 39, issue 5, pp. 105-118.*
Marco Cova et al., Detection and Analysis of Drive-by-Download Attacks and Malicious JavaScript Code, 2010, ACM, pp. 281-290.*

(Continued)

*Primary Examiner* — Bradley Holder
*Assistant Examiner* — Fahimeh Mohammadi
(74) *Attorney, Agent, or Firm* — ALG Intellectual Property, LLC

(57) ABSTRACT

A computer-implemented method for detecting malicious files may include determining that a file on a client system may be subject to a security assessment, generating an initial fingerprint of the file, the generation of the initial fingerprint excluding at least part of the file, sending the initial fingerprint to a server and receiving a response from the server including an indication that the initial fingerprint matches at least one known malicious file but that the file from which the initial fingerprint was generated may not match the malicious file, generating an additional hash of the file on the client system based at least in part on the part of the file excluded in the generation of the initial fingerprint, sending the additional hash to the server, and receiving a response indicating that the file on the client system is malicious. Various other methods, systems, and computer-readable media are also disclosed.

20 Claims, 7 Drawing Sheets

(56) References Cited

OTHER PUBLICATIONS

Shaun Cooley; Systems and Methods for Determining File Identities; U.S. Appl. No. 13/714,426, filed Dec. 14, 2012.
"Identify files by checksum", http://forum.xbmc.org/showthread.php?tid=101026, as accessed on Oct. 10, 2012, Forum.XBMC.
"DVD ID's and File Hashing", http://api.themoviedb.org/2.1/ids-hashes, as accessed on Oct. 10, 2012, API The Moviedb.
"McAfee", http://www.mcafee.com/us/, as accessed Oct. 10, 2012, (Feb. 29, 2000).
"Kaspersky Anti-Virus", http://usa.kaspersky.com/products-services/homecomputer-security/anti-virus/?domain=kaspersky.com, as accessed Oct. 10, 2012, (Aug. 24, 2012).
"Microsoft", http://windows.microsoft.com/en-us/windows/security-essentials-download, as accessed Oct. 10, 2012, (on or before Oct. 10, 2012).

* cited by examiner

SYSTEMS AND METHODS FOR DETECTING MALICIOUS FILES

BACKGROUND

Malicious files have long been a problem in computing, and that problem only continues to grow. Constant internet connectivity and a plethora of file transfer devices create ever more opportunities for malicious files to find their way to users' computers.

Some traditional anti-malware systems keep signature databases of all known malware variants, but as the number of these variants increases, these databases grow to unwieldy sizes. In order to relieve client systems of the burden of storing and updating large anti-malware databases, some traditional anti-malware systems may use cloud-based malware lookups. For example, some traditional anti-malware systems may compute full file hashes to match against cloud-based malware databases. Unfortunately, these traditional anti-malware systems may require that computationally expensive full-file hashes be computed for each file on a client system before that file can be looked up in the cloud database. This additional computational burden may slow down the client, reducing the benefit of hosting the fingerprints in a cloud-based database. Accordingly, the instant disclosure identifies and addresses a need for additional and improved systems and methods for detecting malicious files.

SUMMARY

As will be described in greater detail below, the instant disclosure generally relates to systems and methods for detecting malicious files by generating an initial partial fingerprint of a file on a client system, sending the initial partial fingerprint to a server and receiving a response indicating that the file may be malicious, sending an additional (e.g., more definitive) hash to the server, and receiving a response indicating the file is malicious. In some examples, these systems and methods may generate the additional hash in only a fraction of all cases, minimizing resource-intensive client full-file hashing operations.

In one example a computer-implemented method for detecting malicious files may include (1) determining that a file on a client system may be subject to a security assessment, (2) based on determining that the file may be subject to the security assessment, generating an initial fingerprint of the file on the client system, the generation of the initial fingerprint excluding at least a part of the file, (3) sending the initial fingerprint to a server and receiving a response from the server including an indication that the initial fingerprint matches at least one known malicious file but that the file from which the initial fingerprint was generated may not match the malicious file, (4) generating, in response to the indication, an additional hash of the file on the client system based at least in part on the part of the file excluded in the generation of the initial fingerprint, and (5) sending the additional hash to the server and receiving an additional response from the server indicating that the file on the client system is malicious.

In some embodiments the computer-implemented method may include performing a security action on the file based on the additional response indicating that the file is malicious. In these examples performing the security action on the file may include (1) deleting the file, (2) quarantining the file, and/or (3) alerting a user that the file may be malicious.

In one embodiment the computer-implemented method may further include (1) determining that a second file on the client system may be subject to a second security assessment, (2) based on determining that the second file may be subject to the second security assessment, generating a second initial fingerprint of the second file on the client system, the generation of the second initial fingerprint excluding at least a second part of the second file, (3) sending the second initial fingerprint to the server and receiving a second response from the server including a second indication that the second initial fingerprint may match at least one malicious file and (4) determining, based on the second indication, that the second file on the client system may be malicious.

In one embodiment the indication may include a false positive rate for the initial fingerprint; the false positive rate may be the probability that the additional hash will not match any malicious files.

In one embodiment the false positive rate may be determined by a ratio of known malicious files that the initial fingerprint matches to files not known to be malicious that the initial fingerprint matches.

In one embodiment the false positive rate may be determined by a historical percentage of accurate matches for the initial fingerprint.

In one embodiment the additional hash may represent a larger portion of the file than the initial fingerprint represents.

In one embodiment the part of the file may include (1) content within the file, (2) a size of the file, (3) a timestamp of the file and/or (4) header data of the file.

In one embodiment a system for implementing the above-described method may include (1) a determination module programmed to determine that a file on a client system may be subject to a security assessment, (2) based on determining that the file may be subject to the security assessment, a generation module may be programmed to generate an initial fingerprint of the file on the client system, the generation of the initial fingerprint excluding at least a part of the file, (3) a sending module programmed to send the initial fingerprint to a server and a receiving module programmed to receive a response from the server including an indication that the initial fingerprint matches at least one known malicious file but that the file from which the initial fingerprint was generated may not match the malicious file, (4) the generation module may be programmed to generate, in response to the indication, an additional hash of the file on the client system based at least in part on the part of the file excluded in the generation of the initial fingerprint, (5) the sending module may be programmed to send the additional hash to the server and the receiving module may be programmed to receive an additional response from the server indicating that the file on the client system is malicious and (6) at least one processor configured to execute the determination module, the sending module, the receiving module and the generation module.

In some examples the above-described method may be encoded as computer-readable instructions on a computer-readable-storage medium. For example, a computer-readable-storage medium may include one or more computer-executable instructions that, when executed by at least one processor of a computing device, may cause the computing device to (1) determine that a file on a client system is subject to a security assessment, (2) send the initial fingerprint to a server and receive a response from the server including an indication that the initial fingerprint matches at least one known malicious file but that the file from which the initial fingerprint was generated may not match the malicious file, (3) generate, in response to the indication, an additional hash of the file on the client system based at least in part on the part of the file excluded in the generation of the initial fingerprint, and (4) send the additional hash to the server and receive an additional response from the server indicating that the file on the client system is malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
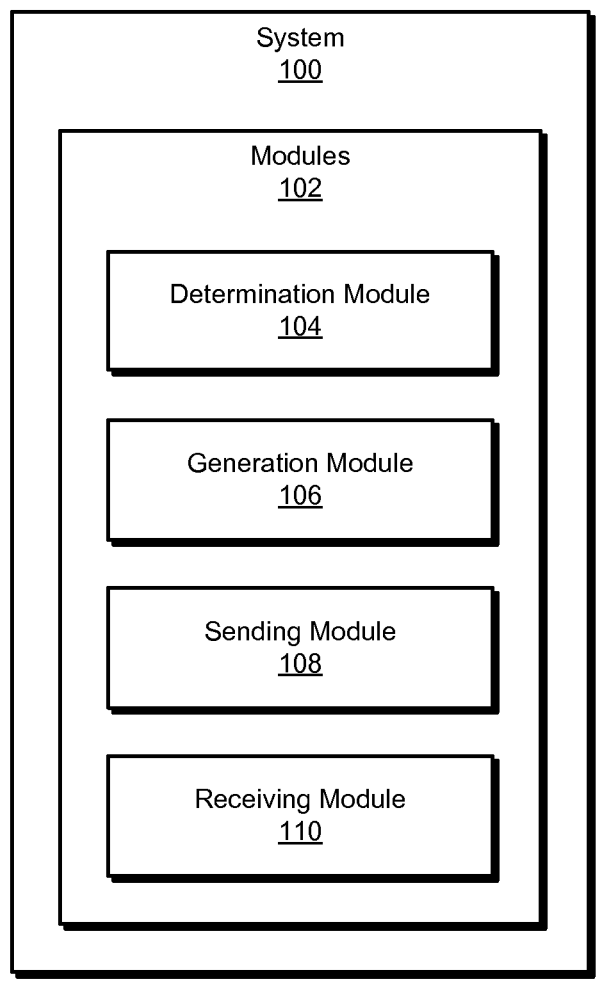
FIG. 1 is a block diagram of an exemplary system for detecting malicious files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malicious files. As will be explained in greater detail below, by initially sending a partial fingerprint of the file and only sending a full and/or more complete hash after receiving an indication that the file may be malicious, the systems and methods described herein may detect a malicious file more quickly and/or with fewer resource-intensive file operations on average without sacrificing detection accuracy.

Figure 2:
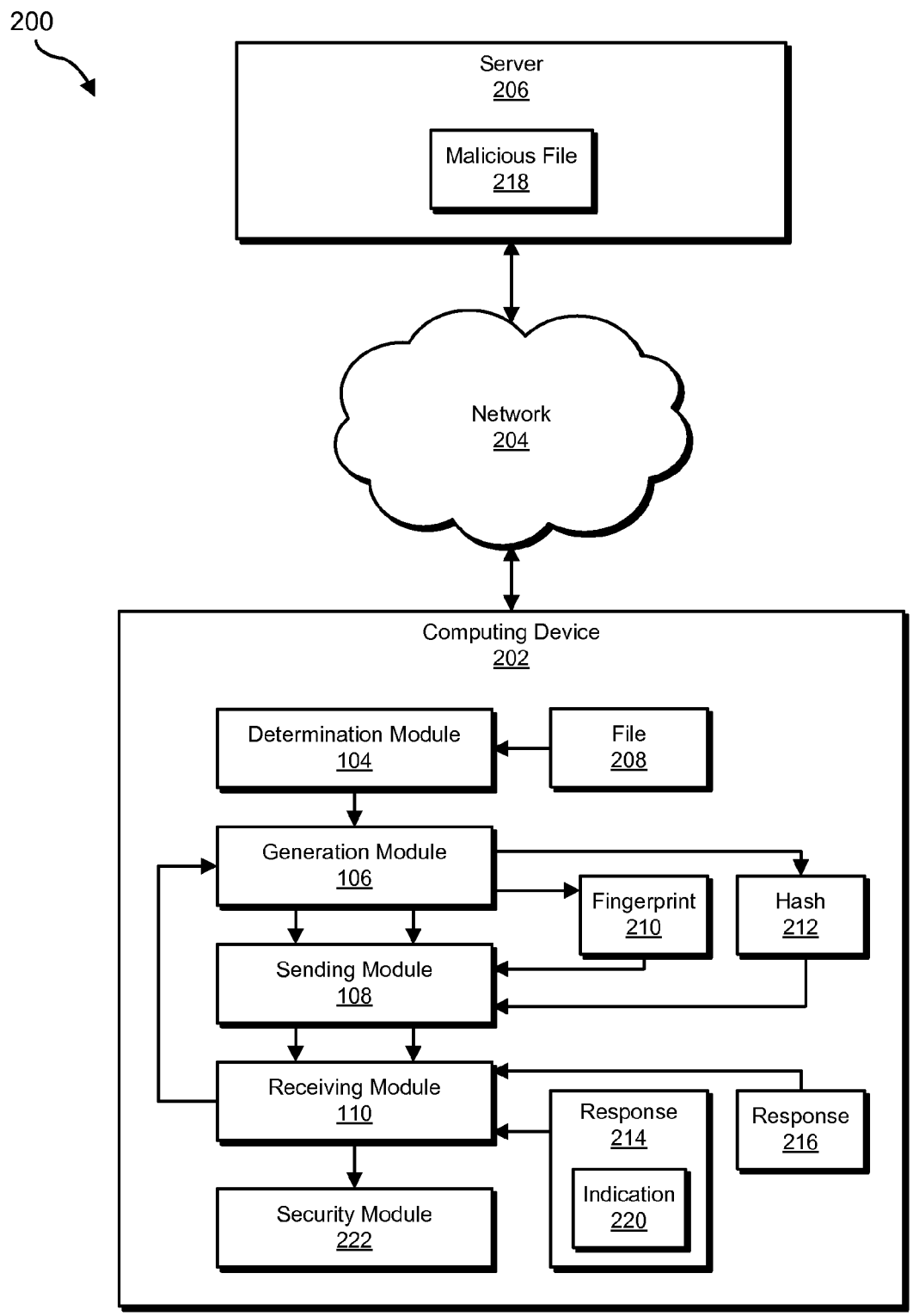
FIG. 2 is a block diagram of an exemplary system for detecting malicious files.
Figure 3:
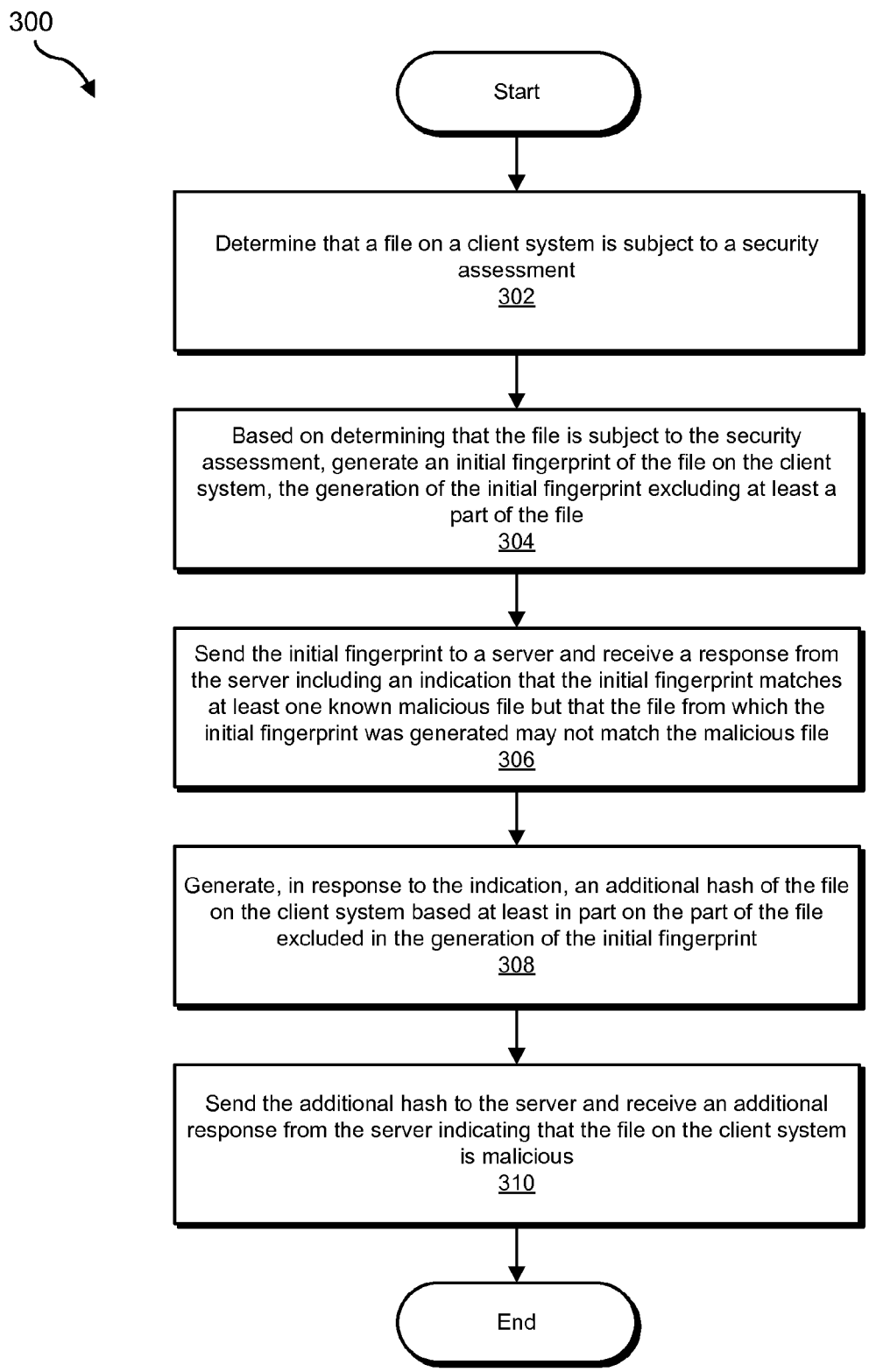
FIG. 3 is a flow diagram of an exemplary method for detecting malicious files.
Figure 4:
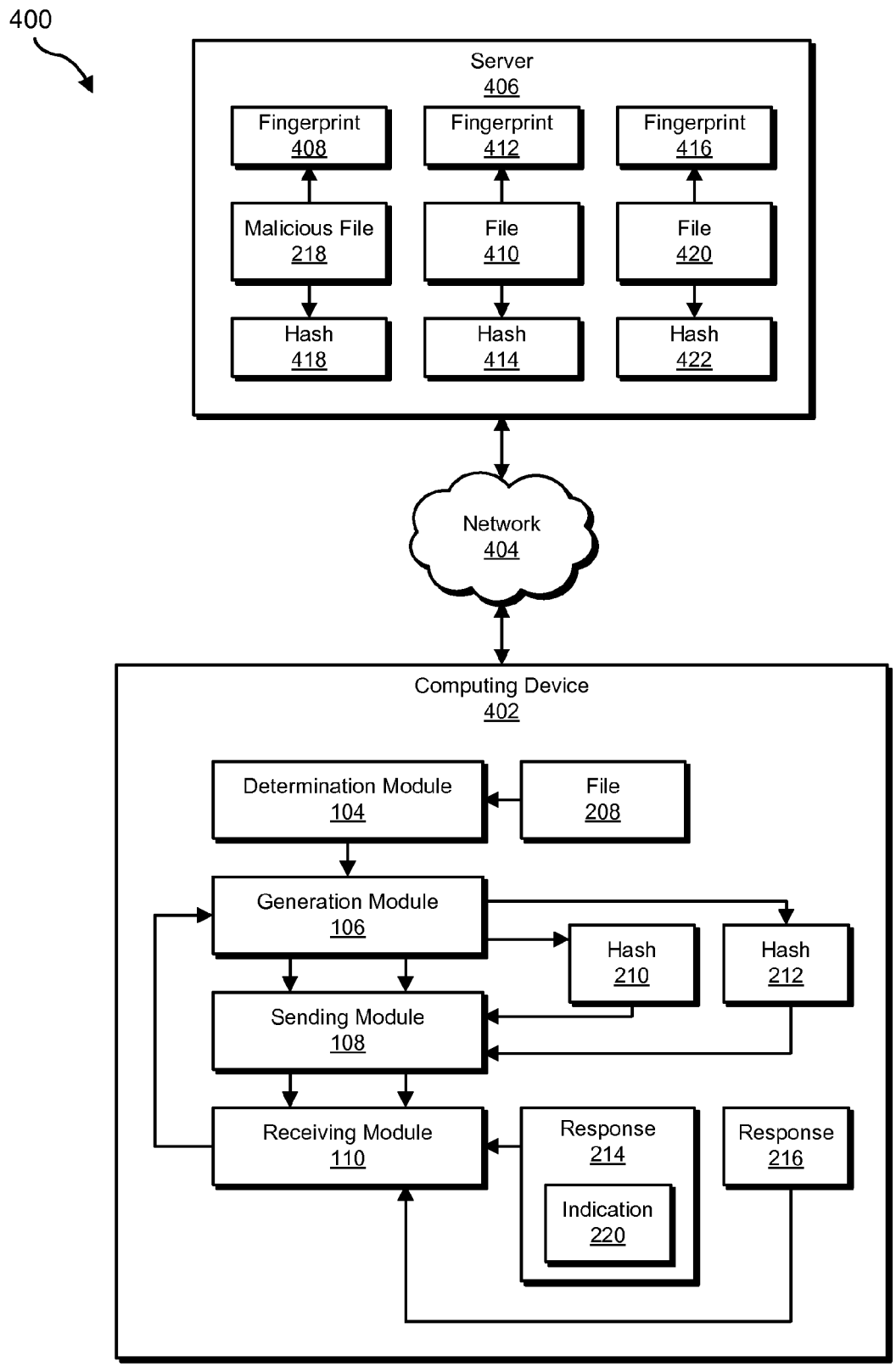
FIG. 4 is a block diagram of an exemplary system for detecting malicious files.

The following will provide, with reference to FIGS. 1-2 and 4, detailed descriptions of exemplary systems for detecting malicious files. Detailed descriptions of corresponding computer-implemented methods will also be provided in connection with FIG. 3. Detailed descriptions of exemplary file parts will be provided in FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting malicious files. As illustrated in this figure, exemplary system 100 may include one or more modules 102 for performing one or more tasks. For example, and as will be explained in greater detail below, exemplary system 100 may also include a determination module 104 programmed to determine that a file on a client system may be subject to a security assessment. Exemplary system 100 may additionally include a generation module 106 programmed to, based on determining that the file is subject to the security assessment, generate an initial fingerprint of the file on the client system, the generation of the initial fingerprint excluding at least a part of the file. Exemplary system 100 may additionally include a sending module 108 programmed to send the initial fingerprint to a server. Exemplary system 100 may also include a receiving module 110 programmed to receive a response from the server including an indication that the initial fingerprint an indication that the initial fingerprint matches at least one known malicious file but that the file from which the initial fingerprint was generated may not match the malicious file.

Generation module 106 may be further programmed to generate, in response to the indication, an additional hash of the file on the client system based at least in part on the part of the file excluded in the generation of the initial fingerprint. Sending module 108 may be further programmed to send the additional hash to the server. Receiving module 110 may be further programmed to receive an additional response from the server indicating that the file on the client system is malicious. Although illustrated as separate elements, one or more of modules 102 in FIG. 1 may represent portions of a single module or application.

In certain embodiments one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Additionally or alternatively, server 206 may be programmed with one or more of modules 102.

In one embodiment one or more of modules 102 from FIG. 1 may, when executed by at least one processor of computing device 202 and/or server 206, facilitate computing device 202 and/or server 206 in detecting malicious files. For example, and as will be described in greater detail below, one or more of modules 102 may cause computing device 202 and/or server 206 to detect malicious files. For example, and as will be described in greater detail below, determination module 104 may be programmed to determine that a file 208 on a computing device 202 is subject to a security assessment. Generation module 106 may be programmed to generate a limited fingerprint 210 of file 208 on computing device 202, the generation of fingerprint 210 excluding at least a part of file 208. Sending module 108 may be programmed to send fingerprint 210 to a server 206 and receiving module 110 may be programmed to receive a response 214 from server 206 which may include an indication 220 that fingerprint 210 may match at least one known malicious file 218 but that the file from which fingerprint 210 was generated (e.g., file 208) may not match malicious file 218. Generation module 106 may be further programmed to generate, in response to indication 220, a hash 212 of file 208 on computing device 202 based at least in part on the part of file 208 excluded in the generation of fingerprint 210. Sending module 108 may be further programmed to send hash 212 to server 206 and receiving module 110 may be programmed to receive a response 216 from server 206 indicating that file 208 on computing device 202 may be malicious file 218.

In some embodiments security module 222 may perform a security action based on determining that file 208 may match malicious file 218. In some examples the security action may include deleting file 208, quarantining file 208, and/or alerting a user that file 208 may be malicious.

In some embodiments indication 220 may include a false positive rate. The phrase "false positive rate," when used herein, may in some examples refer to the probability and/or rate at which that the file may not match any known malicious files. In some examples the false positive rate may be determined by a ratio of known malicious files that the hash may match to files not known to be malicious that the hash may match. In some examples the false positive rate may be determined by a historical percentage of accurate matches for the hash.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of comparing file hashes. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for detecting malicious files. The steps shown in FIG. 3 may be performed by any suitable computer-executable code and/or computing system. In some embodiments the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may determine that a file on a client system is subject to a security assessment. For example, at step 302 determination module 104 may, as part of computing device 202 in FIG. 2, determine that file 208 on computing device 202 is subject to a security assessment.

As used herein, the phrase "security assessment" may refer to any suitable security assessment, analysis, and/or scan. For example, the security assessment may include a malware scan, an intrusion prevention analysis, etc. As used herein, the term "malware" may refer to any virus, worm, Trojan horse, spyware, and/or any other malicious, illegitimate, and/or unauthorized software and/or data object.

Determination module 104 may determine that the file is subject to a security assessment in any suitable manner. For example, determination module 104 may determine that the file is subject to a security assessment while scanning the client system for malware and encountering the file. Additionally or alternatively, determination module 104 may determine that the file is subject to a security assessment based on a security policy that identifies the file as suspect and/or potentially malicious. For example, determination module 104 may determine that the file is subject to a security assessment based on an origin of the file, a behavior originating from the file, and/or a lack of a credential on the part of the file.

Returning to FIG. 3, at step 304 one or more of the systems described herein may, based on determining that the file is subject to the security assessment, generate an initial fingerprint of the file on the client system, the generation of the initial fingerprint excluding at least a part of the file. For example, at step 304 generation module 106 may, as part of computing device 202 in FIG. 2, based on determining that file 208 is subject to the security assessment, generate fingerprint 210 of file 208 on computing device 202, the generation of fingerprint 210 excluding at least a part of file 208.

As used herein, the term "fingerprint" may refer to any abbreviated representation of a file and/or the contents of a file. For example, the term "fingerprint" may refer to the outputs of one or more hash functions applied to various regions of the file, values extracted from the file, the file size, the number of sections in the file, checksums, and/or any other type of file identifiers that identify a file and/or file content. Generally, the fingerprint may include any information tending to identify the file, including any of the aforementioned examples, alone or in combination. The hash values may be generated by any of a variety of cryptographic hash functions (including, e.g., MD5 and/or SHA256). In some examples, the term "fingerprint" as it relates to a given file may refer to a single value that consistently represents the file over time and that does not vary unless the content of the file being fingerprinted varies.

Generation module 106 may generate the initial fingerprint of the file in any suitable manner. For example, generation module 106 may generate hashes of multiple regions of the file (e.g., totaling no more than 100 kilobytes) and combine the hashes into a single fingerprint. Additionally or alternatively, generation module 106 may identify one or more features and/or metadata of the file (e.g., the size of the file, a number of sections in the file, an embedded timestamp indicating when the file was created, the size of one or more sections of the file, and/or file header metadata, etc.) and combine these features into a fingerprint. For example, generation module 106 may concatenate one or more values derived from one or more features of the file (e.g., "15523, 72,3,456,333") and/or generate a hash of such a concatenation. In some examples, the initial fingerprint may represent a lightweight hash. As used herein, the phrase "lightweight hash" may refer to any hash generated using a limited amount of computing resources. For example, generation module 106 may generate the initial fingerprint based on a little total amount of the file content (e.g., no more than 5 percent of the file content, no more than 100 kilobytes of the file content, etc.).

At step 306 one or more of the systems described herein may send the initial fingerprint to a server and receive a response from the server including an indication that the initial fingerprint matches at least one known malicious file but that the file from which the initial fingerprint was generated may not match the malicious file. For example, at step 306 sending module 108 may, as part of computing device 202 in FIG. 2, send initial fingerprint 210 to server 206 and receiving module 110 may receive response 214 from server 206 including indication 220 that initial fingerprint 210 may match at least one known malicious file (e.g., including malicious file 218) but that the file from which fingerprint 210 was generated (e.g., file 208) may not match malicious file 218.

Sending module 108 may send the initial fingerprint to the server in any suitable manner. For example, sending module 108 may send the initial fingerprint to the server in the form of a database query for files matching the initial fingerprint. Additionally or alternatively, sending module 108 may send the initial fingerprint to the server as a request for a determination as to whether the file is malicious.

Receiving module 110 may receive any suitable type of indication that the initial fingerprint matches at least one known malicious file but that the file from which the initial fingerprint was generated may not match the malicious file. For example, receiving module 110 may receive a request from the server to send an additional (e.g., full and/or more comprehensive) hash. Additionally or alternatively, receiving module 110 may receive a false positive rate for the initial fingerprint. The false positive rate may include the probability that an additional (e.g., definitive, full, and/or comprehensive) hash will not match any malicious files (e.g., despite the initial fingerprint matching at least one malicious file). Additionally or alternatively, the false positive rate may represent a ratio of known malicious files that the initial fingerprint matches to files not known to be malicious that the initial fingerprint matches. For example, the server may access a database of files and/or file hashes (e.g., of malicious files, legitimate files, and files of unknown and/or indeterminate legitimacy). Upon receiving the initial fingerprint from the client system, the server may query the database for files matching the initial fingerprint and determine that eighteen files malicious files match the initial fingerprint and two legitimate files match the initial fingerprint. Accordingly, the server may determine that the initial fingerprint has a false positive rate of 10%.

In some examples, the server may determine the false positive rate according to a historical percentage of accurate matches for the initial fingerprint. For example, the server may have received hashes identical to the initial fingerprint on previous occasions (e.g., from various client systems) as well as information from the client systems indicating whether the initial fingerprints originated from malicious files (e.g., the information may include a subsequent complete hash of a file that was the source of the initial fingerprint, a copy of the file, and/or a determination from an anti-malware system that the file exhibited malicious behavior).

In some examples, receiving module 110 may receive an indication that the initial fingerprint may match at least one known malicious file and does not match any files not known to be malicious. Additionally or alternatively, receiving module 110 may receive an indication that the initial fingerprint is malicious with no chance and/or a negligible chance of a false positive. In these examples, the systems and methods described herein may not generate an additional hash and may immediately determine that the file may be malicious.

At step 308 one or more of the systems described herein may generate, in response to the indication, an additional hash of the file on the client system based at least in part on the part of the file excluded in the generation of the initial fingerprint. For example, at step 308 generation module 106 may, as part of computing device 202 in FIG. 2, generate, in response 214 to indication 220, hash 212 of file 208 on client system 202 based at least in part on the part of file 208 excluded in the generation of initial fingerprint 210.

As used herein, the term "hash" may refer to any abbreviated representation of a file and/or the contents of a file. For example, the term "hash" may refer to the outputs of one or more hash functions, fingerprints, checksums, and/or any other type of file identifiers that uniquely identify a file and/or file content (barring a collision). For example, the hash may be generated by any of a variety of cryptographic hash functions (including, e.g., MD5 and/or SHA256).

Generation module 106 may generate the additional hash in any suitable manner. For example, generation module 106 may generate the additional hash by generating a complete hash of the file. Additionally or alternatively, generation module 106 may generate the additional hash by generating a hash of only the portions of the file not used in the generation of the initial fingerprint. In some examples, generation module 106 may generate the additional hash by generating and concatenating one or more hashes of unique portions of the file that were too large to process for a lightweight fingerprint.

At step 310 one or more of the systems described herein may send the additional hash to the server and receive an additional response from the server indicating that the file on the client system is malicious. For example, at step 310 sending module 108 may, as part of computing device 202 in FIG. 2, send hash 212 to server 206 and receiving module 110 may receive a response 216 from server 206 indicating that file 208 on computing device 202 is malicious file 218.

Sending module 108 may send the additional hash to the server in any suitable manner. For example, sending module 108 may send the additional hash to the server in the form of a database query for files matching the additional hash. Additionally or alternatively, sending module 108 may send the additional hash to the server as a request for a determination as to whether the file is malicious.

Receiving module 110 may receive the additional response in any suitable format. For example, the additional response may include a categorization of the file as malicious. Additionally or alternatively, the additional response may include an instruction to the client system for handling the file.

In some examples, after receiving the additional response indicating that the file is malicious, one or more of the systems described herein (e.g., security module 222) may perform a security action on the file based on the additional response. For example, security module 222 may delete the file, quarantine the file, and/or alert a user that the file is malicious.

FIG. 4 is a block diagram of an exemplary computing system 400 for detecting malicious files. In some examples server 406 may contain malicious file 218, file 410 and/or file 420. In these examples fingerprint 408 and/or hash 418 may represent malicious file 218, fingerprint 412 and/or hash 414 may represent file 410, and/or fingerprint 416 and/or hash 422 may represent file 420. In these examples hash 418 may represent a larger portion of malicious file 218 than fingerprint 408 may represent. In some examples if fingerprint 408 matches the initial fingerprint generated by the client system then hash 418 may match the additional hash generated by the client system.

Figure 5:
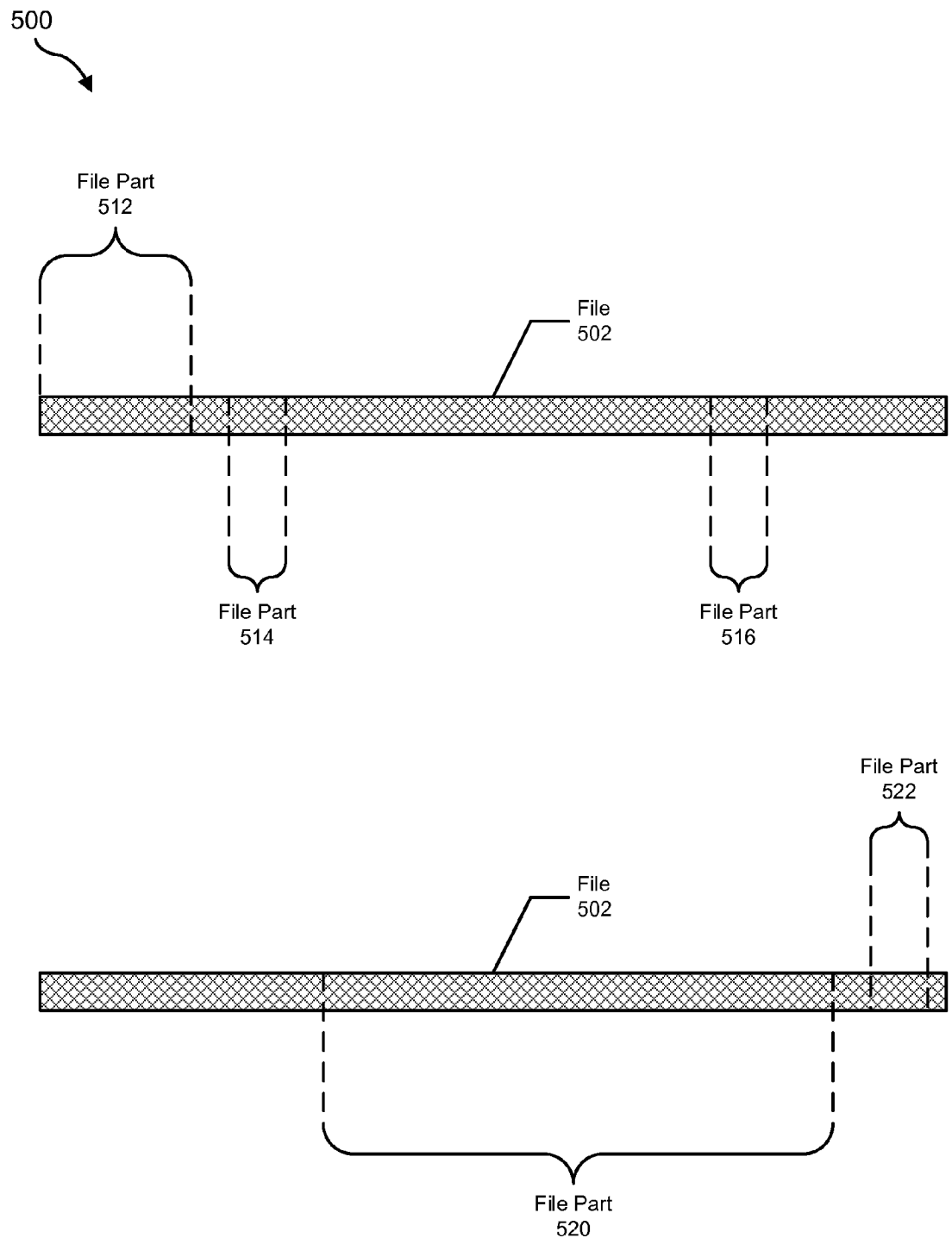
FIG. 5 is a diagram of exemplary file parts.

FIG. 5 is a diagram of an exemplary set of file parts 500. As shown in FIG. 5, a file 502 may include various file parts, including file parts 512, 514, 516, 520, and 522. In some examples fingerprint 210 may be calculated from file part 512, file part 514 and file part 516, and hash 212 may be calculated from file part 520 and file part 522. Additionally or alternatively, hash 212 may be calculated from the entirety of file 502. In these examples, hash 212 may include a larger portion of the file than fingerprint 210. In some embodiments a file part may represent content within the file, the size of the file, the timestamp of the file, and/or a piece of header data of the file.

As explained above in connection with method 300 in FIG. 3, a file on a client system may be subject to a security assessment. Instead of generating a full hash of the file and submitting the full hash to a cloud-based security server, the client system may generate a lightweight fingerprint representing the file and send it to the server. The client system may receive a response from the server indicating that the lightweight fingerprint may match one or more files known to be malicious, but that the lightweight fingerprint proved insufficient to conclusively determine that the file is malicious. The client system may then generate an additional hash representing a larger portion of the file than the initial fingerprint, and send the additional hash to the server. The client system may receive a response from the server indicating that the file almost certainly is malicious and/or matches exclusively malicious files, and may determine that the file is malicious. The client may then take a security action based on the determination. By first attempting to use a lightweight fingerprint to determine whether the file is malicious, the systems and methods described herein may avoid resource-intensive operations in a significant proportion of cases (e.g., 98 or 99 out of 100 file scans).

Figure 6:
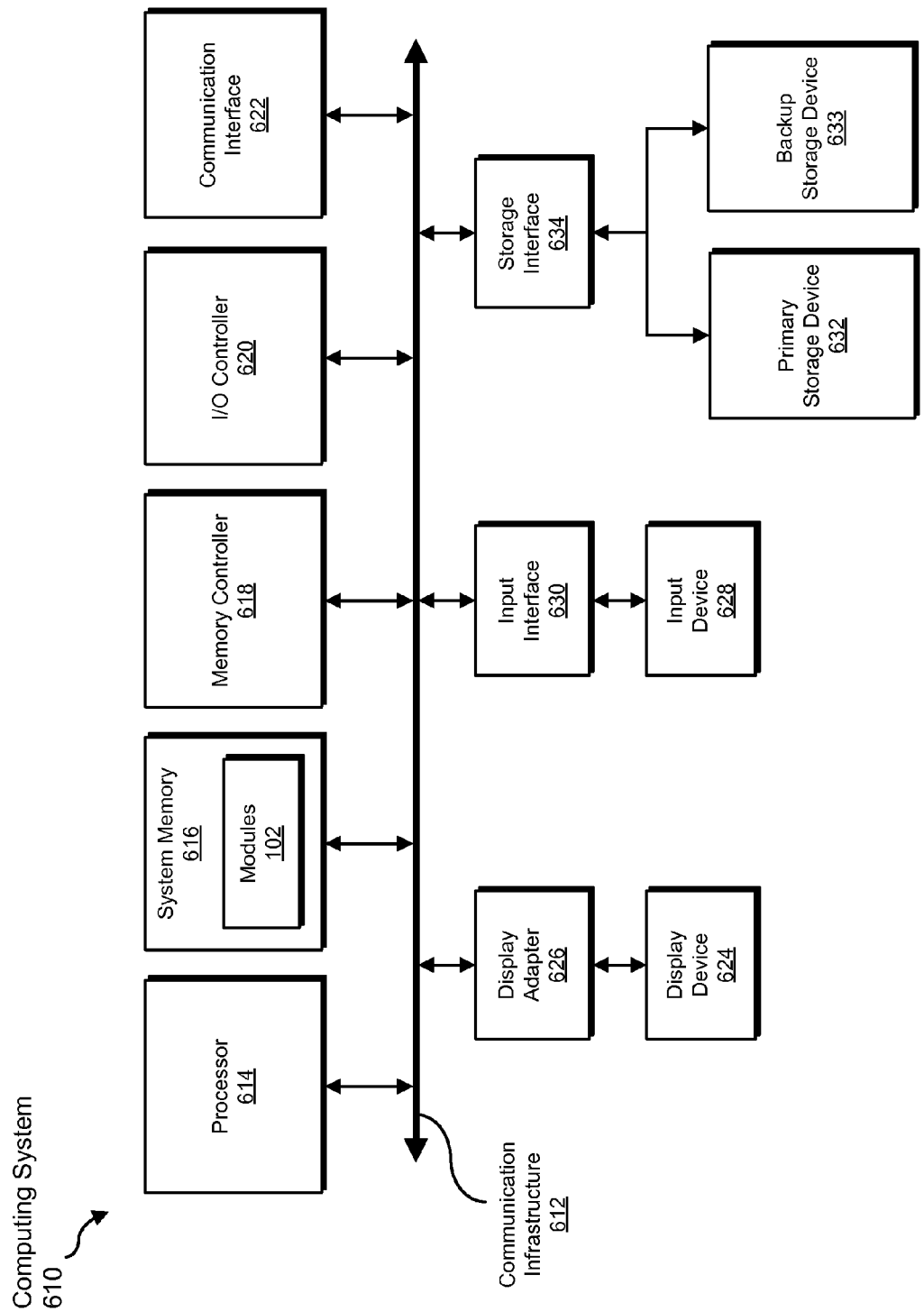
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the determining, generating, sending, receiving, performing, deleting, quarantining, and/or alerting steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
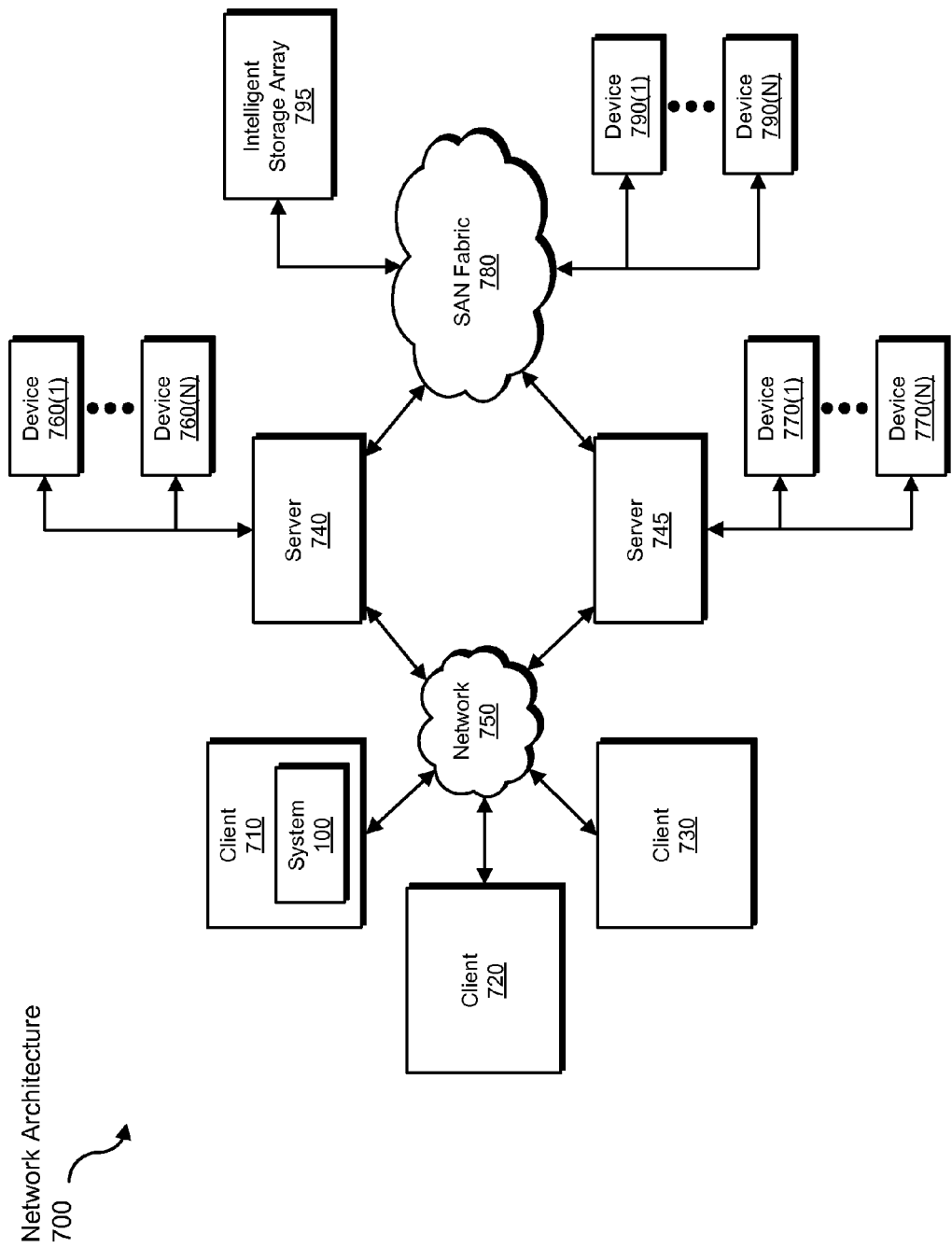
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the determining, generating, sending, receiving, performing, deleting, quarantining, and/or alerting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malicious files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file, output a result of the transformation to the sending module, use the result of the transformation to generate a hash, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malicious files, at least a portion of the method being performed by a computing device comprising at least one processor, the method comprising:
   determining that a file previously stored on a client system is subject to a security assessment;
   based on determining that the file is subject to the security assessment, generating an initial fingerprint of the file on the client system, the generation of the initial fingerprint excluding at least a part of the file;
   sending, from the client system, the initial fingerprint to a server and receiving a response from the server comprising an indication that the initial fingerprint matches at least one known malicious file but that the file from which the initial fingerprint was generated may not match the malicious file;
   generating, in response to the indication, an additional fingerprint of the file on the client system based at least in part on the part of the file excluded in the generation of the initial fingerprint;
   sending, from the client system, the additional fingerprint to the server and receiving an additional response from the server indicating that the file on the client system is malicious;
   determining that a second file previously stored on the client system is subject to a second security assessment;
   based on determining that the second file is subject to the second security assessment, generating a second initial fingerprint of the second file on the client system, the generation of the second initial fingerprint excluding at least a second part of the second file;
   sending, from the client system, the second initial fingerprint to the server and receiving a second response from the server comprising a second indication that the second initial fingerprint matches at least one malicious file;
   determining, based on the second indication, despite the second part of the second file being excluded from the generation of the second initial fingerprint, and without generating a further fingerprint of the second file after generating the second initial fingerprint, that the second file on the client system is malicious.

2. The computer-implemented method of claim 1, further comprising performing a security action on the file based on the additional response indicating that the file is malicious.

3. The computer-implemented method of claim 2, wherein performing the security action on the file comprises at least one of:
   deleting the file;
   quarantining the file;
   alerting a user that the file is malicious.

4. The computer-implemented method of claim 1, wherein the indication that the initial fingerprint matches the at least one known malicious file comprises a false positive rate for the initial fingerprint, the false positive rate comprising the probability that the additional fingerprint will not match any malicious files.

5. The computer-implemented method of claim 4, wherein the false positive rate is determined by a ratio of known malicious files that the initial fingerprint matches to files not known to be malicious that the initial fingerprint matches.

6. The computer-implemented method of claim 4, wherein the false positive rate is determined by a historical percentage of accurate matches for the initial fingerprint.

7. The computer-implemented method of claim 1, wherein the additional fingerprint represents a larger portion of the file than the initial fingerprint represents.

8. The computer-implemented method of claim 1, wherein the part of the file comprises at least one of:
   content within the file;
   a size of the file;
   a timestamp within the file;
   header data of the file.

9. A system for detecting malicious files:
   the system comprising:
   a determination module programmed to determine that a file previously stored on a client system is subject to a security assessment;
   a generation module programmed to, based on determining that the file is subject to the security assessment, generate an initial fingerprint of the file on the client system, the generation of the initial fingerprint excluding at least a part of the file;
   a sending module programmed to send, from the client system, the initial fingerprint to a server and a receiving module programmed to receive a response from the server comprising an indication that the initial fingerprint matches at least one known malicious file but that the file from which the initial fingerprint was generated may not match the malicious file;
   where the generation module is further programmed to generate, in response to the indication, an additional fingerprint of the file on the client system based at least in part on the part of the file excluded in the generation of the initial fingerprint;
   where the sending module is further programmed to send, from the client system, the additional fingerprint to the server and the receiving module is further programmed to receive an additional response from the server indicating that the file on the client system is malicious;
   where the determination module is further programmed to determine that a second file previously stored on the client system is subject to a second security assessment;
   where the generation module is further programmed to, based on determining that the second file is subject to the second security assessment, generate a second initial fingerprint of the second file on the client system, the generation of the second initial fingerprint excluding at least a second part of the second file;
   where the sending module is further programmed to send, from the client system, the second initial fingerprint to the server and the receiving module is further programmed to receive a second response from the server comprising a second indication that the second initial fingerprint matches at least one malicious file;

where the determination module is further programmed to determine, based on the second indication, despite the second part of the second file being excluded from the generation of the second initial fingerprint, and without generating a further fingerprint of the second file after generating the second initial fingerprint, that the second file on the client system is malicious;

at least one hardware processor configured to execute software comprising the determination module, the generation module, the sending module, and the receiving module.

10. The system of claim 9, the software further comprising a security module programmed to perform a security action on the file based on the additional response indicating that the file is malicious.

11. The system of claim 10, wherein the security module is programmed to perform the security action on the file by at least one of:
deleting the file;
quarantining the file;
alerting a user that the file is malicious.

12. The system of claim 9, wherein the indication that the initial fingerprint matches the at least one known malicious file comprises a false positive rate for the initial fingerprint, the false positive rate comprising the probability that the additional fingerprint will not match any malicious files.

13. The system of claim 12, wherein the false positive rate is determined by a ratio of known malicious files that the fingerprint matches to files not known to be malicious that the fingerprint matches.

14. The system of claim 12, wherein the false positive rate is determined by a historical percentage of accurate matches for the initial fingerprint.

15. The system of claim 9, wherein the additional fingerprint represents a larger portion of the file than the initial fingerprint represents.

16. The system of claim 9, wherein the part of the file comprises at least one of:
content within the file;
a size of the file;
a timestamp within the file;
header data of the file.

17. A non-transitory computer-readable-storage medium comprising one or more computer-readable instructions that, when executed by at least one processor of a computing device, cause the computing device to:
determine that a file previously stored on a client system is subject to a security assessment;
based on determining that the file is subject to the security assessment, generate an initial fingerprint of the file on the client system, the generation of the initial fingerprint excluding at least a part of the file;
send, from the client system, the initial fingerprint to a server and receive a response from the server comprising an indication that the initial fingerprint matches at least one known malicious file but that the file from which the initial fingerprint was generated may not match the malicious file;
generate, in response to the indication, an additional fingerprint of the file on the client system based at least in part on the part of the file excluded in the generation of the initial fingerprint;
send, from the client system, the additional fingerprint to the server and receive an additional response from the server indicating that the file on the client system is malicious;
determine that a second file previously stored on the client system is subject to a second security assessment;
based on determining that the second file is subject to the second security assessment, generate a second initial fingerprint of the second file on the client system, the generation of the second initial fingerprint excluding at least a second part of the second file;
send, from the client system, the second initial fingerprint to the server and receive a second response from the server comprising a second indication that the second initial fingerprint matches at least one malicious file;
determine, based on the second indication, despite the second part of the second file being excluded from the generation of the second initial fingerprint, and without generating a further fingerprint of the second file after generating the second initial fingerprint, that the second file on the client system is malicious.

18. The non-transitory computer-readable-storage medium of claim 17, wherein the indication that the initial fingerprint matches the at least one known malicious file comprises a false positive rate for the initial fingerprint, the false positive rate comprising the probability that the additional fingerprint will not match any malicious files.

19. The non-transitory computer-readable-storage medium of claim 18, wherein the false positive rate is determined by a ratio of known malicious files that the initial fingerprint matches to files not known to be malicious that the initial fingerprint matches.

20. The non-transitory computer-readable-storage medium of claim 18, wherein the false positive rate is determined by a historical percentage of accurate matches for the initial fingerprint.

* * * * *